J. S. NAVARRO.
TROLLEY WHEEL FOR ELECTRIC STREET CARS.
APPLICATION FILED APR. 9, 1921.
1,391,903. Patented Sept. 27, 1921.
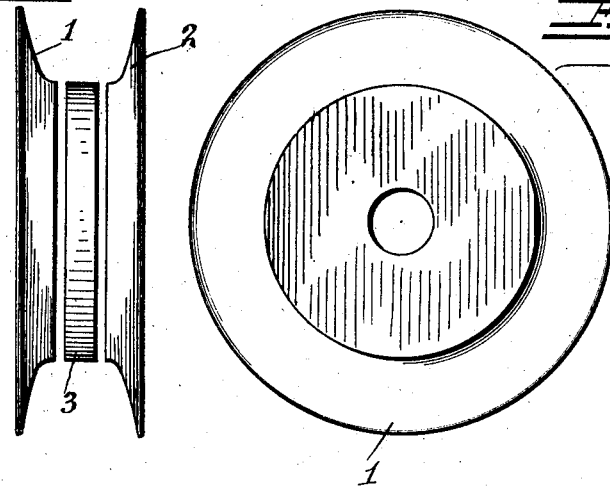
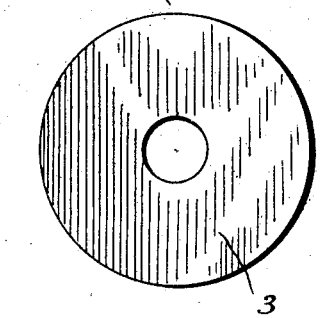
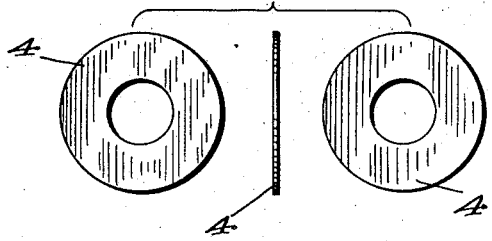
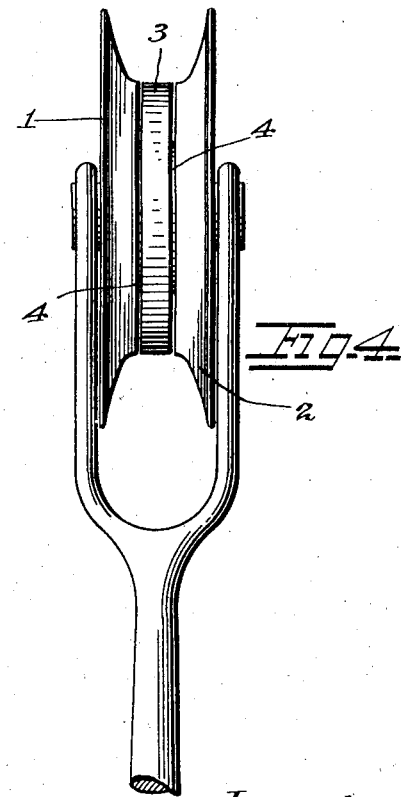
Inventor:
Julio Soto Navarro
by Wm Wallace White
Attorney.

UNITED STATES PATENT OFFICE.

JULIO SOTO NAVARRO, OF HABANA, CUBA.

TROLLEY-WHEEL FOR ELECTRIC STREET-CARS.

1,391,903.  Specification of Letters Patent.  Patented Sept. 27, 1921.

Application filed April 9, 1921. Serial No. 459,913.

*To all whom it may concern:*

Be it known that I, JULIO SOTO NAVARRO, a citizen of the Republic of Cuba, residing at 88 Prado St., Habana, Cuba, have invented a new and useful Trolley-Wheel for Electric Street-Cars, of which the following is a specification.

My invention relates to improvements in trolley wheels for electric street cars, in which a wheel is made in three or more separate parts (in disks form) to be placed together on same axle, each part having movement independently of the other parts.

The objects of my improvement are, first, to avoid the trolley wheel jumping the wire at the curves, or other obstacles; second, to obtain a better electrical connection; and third, resulting more economically.

I attain these objects, by the mechanism illustrated in the accompanying drawing, in which,—

Figure 1, is a vertical view of the three parts of wheel, (divided in disks form) : Fig. 2, represents another view of same parts of wheel: Fig. 3, represents washers to be used between each division of the wheel: Fig. 4, represents the three parts of wheel joined on same axle (with washers between) and placed on the harp of a trolley pole, ready for use.

By using the wheel composed of separate parts, flanged parts 1 and 2 at each side, and intermediate cylindrical parts 3, three parts in all in the present instance, an independent movement or revolution of each part on the axle 5 of the harp 6 is obtained, affording a protection against the wheel leaving the wire at each curve. Trials have proven, that each part of this wheel turns at a different rate of velocity according to the angle of the curve. This improvement avoids the stern resistance of the one piece wheel, which by its nature, forces itself off the wire at almost every curve or obstacle. By placing washers 4 (shown in Fig. 3) between these separate parts of wheel, an easier action of each part is obtained.

By using the wheel composed of separate parts, the surface exposed to electricity is increased, therefore obtaining a more perfect electrical connection.

By using the wheel composed of separate parts, stands to reason that it is more economical to replace a damaged portion of the wheel, than to replace the entire wheel.

I claim:

A trolley wheel for electric street cars comprising at least three separate parts, the outer parts flanged, and the intermediate parts of cylindrical form (in disks form) these parts to be used joined together on the same axle, each having free and independent movement of the other.

In testimony whereof I have signed my name to this specification.

JULIO SOTO NAVARRO.